United States Patent [19]

Grosjean et al.

[11] 4,292,008
[45] Sep. 29, 1981

[54] GAS TURBINE COOLING SYSTEMS

[75] Inventors: William C. Grosjean, Poway; John J. Hensley, Delmar, both of Calif.

[73] Assignee: International Harvester Company, Chicago, Ill.

[21] Appl. No.: 35,632

[22] Filed: May 3, 1979

Related U.S. Application Data

[63] Continuation-in-part of Ser. No. 831,961, Sep. 9, 1977, Pat. No. 4,173,120.

[51] Int. Cl.³ ............................................. F01D 5/18
[52] U.S. Cl. .................................... 415/115; 415/116
[58] Field of Search ....................... 415/115, 116, 117

[56] References Cited

U.S. PATENT DOCUMENTS

| | | | |
|---|---|---|---|
| 2,685,429 | 8/1954 | Auyer | 415/115 |
| 3,362,681 | 1/1968 | Smuland | 415/115 |
| 3,558,237 | 1/1971 | Wall | 415/115 |
| 3,628,880 | 12/1971 | Smuland | 415/115 |
| 3,965,066 | 6/1976 | Sterman et al. | 415/115 |
| 4,017,207 | 4/1977 | Bell | 415/115 |

Primary Examiner—Everette A. Powell, Jr.
Attorney, Agent, or Firm—LeBlanc, Nolan, Shur & Nies

[57] ABSTRACT

A gas turbine engine having a turbine with internally cooled, stationary nozzles incorporated into first and second stage nozzle segments and a system for supplying air to the nozzles, for effecting a flow of cooling air into impingement and film cooling relationships with a tip shoe mounted in the nozzle case, and for generating a flow of air which first impingement cools a nozzle case lip supporting the upstream ends of the second stage nozzle segments and then acts as a buffer, keeping hot gases from entering the space between the nozzles and the nozzle case.

3 Claims, 10 Drawing Figures

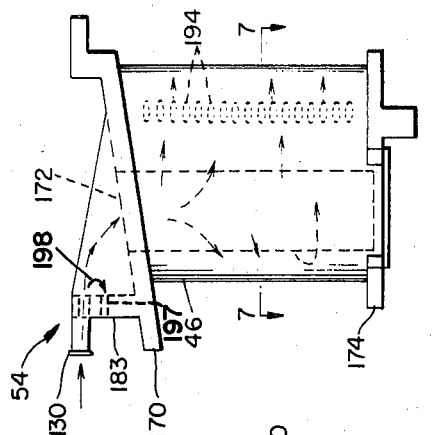
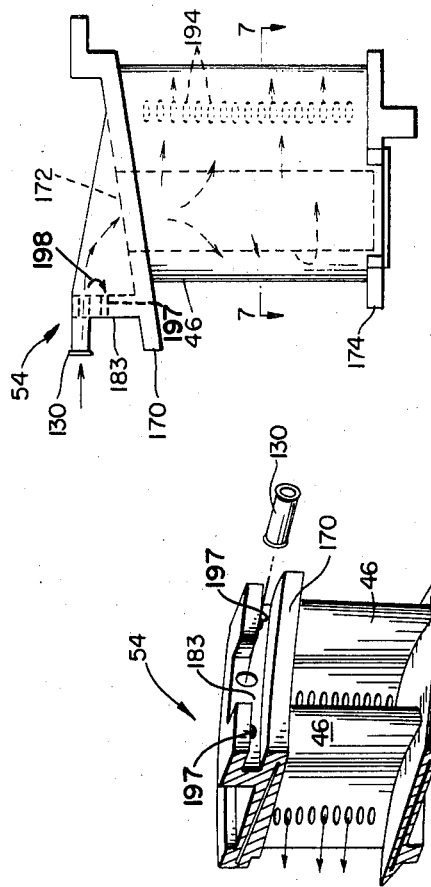
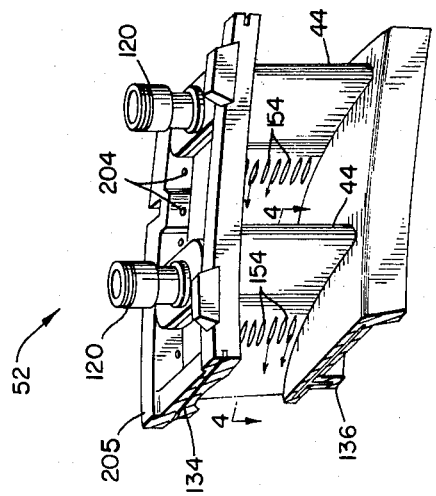
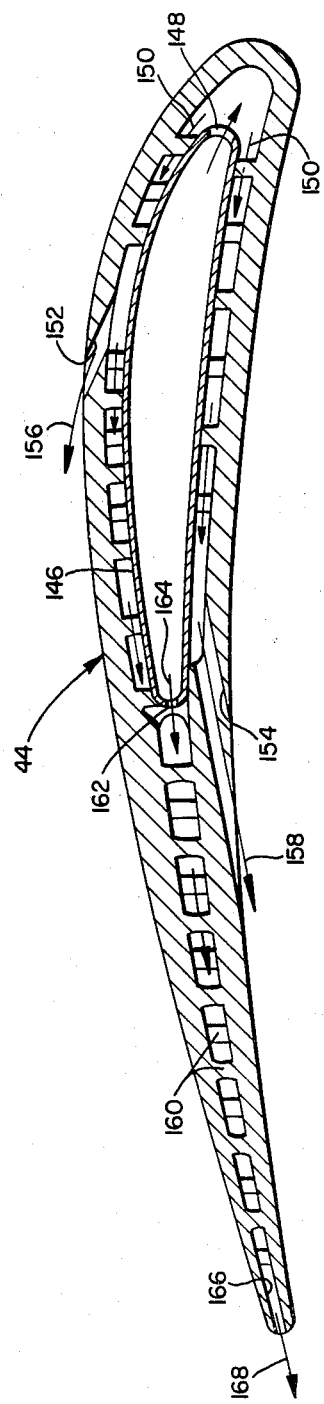
FIG. 6
FIG. 5
FIG. 3
FIG. 4

GAS TURBINE COOLING SYSTEMS

This application is a continuation-in-part of application Ser. No. 831,961 filed Sept. 9, 1977, now U.S. Pat. No. 4,173,120, issued Nov. 6, 1979.

The present invention relates to gas turbine engines and, more specifically, to gas turbine engines having turbine nozzle, nozzle case, and tip shoe cooling systems.

Parent application Ser. No. 831,961 discloses novel cooling systems which are capable of limiting the temperatures of turbine components to a maximum of 1500° F. at turbine inlet gas temperatures in the 1800° F. range. At the lower temperature, 30,000 hours (ca. 3.4 years) of continuous duty operation and useful component lifes of 30 years are attainable.

One of the novel cooling systems disclosed in the parent application is designed to cool the first and second stages nozzles, the nozzle case, and other components of a two-shaft turbine engine which has a two-stage gas producer turbine for driving the compressor of the engine and a power turbine for driving, as examples, an electrical generator, a booster compressor, or a mechanical drive prime mover.

In the cooling system described in the parent application air is bled from the discharge side of the compressor through a longitudinally extending annular passage to a plenum or chamber between the turbine nozzle case and the external turbine housing. One stream of the compressor discharge air flows through a screen into the first stage nozzles of the gas producer turbine while a second stream is filtered through the screen, impinged against the nozzle case to cool it, and then directed into the second stage nozzles of the gas producer turbine.

The nozzles in both the first and second stages are cooled by an optimized combination of impingement, convective, and film cooling. In both stages the air flows into a sheet metal insert inside each nozzle. Part of the air exits through holes in the leading edge of the insert providing impingement cooling of the leading edge of the nozzle. The air then flows toward the trailing edge of the nozzle through the space between the latter and the insert, convectively cooling the forward part of the nozzle. This air is discharged through slots in the nozzle to produce film cooling of its aft or trailing edge portion.

The first-stage nozzles have rows of air discharge holes on both the pressure and suction sides of the nozzles. The second stage nozzles have a single row of holes on the pressure side thereof near the trailing edge.

The remainder of the air introduced into the nozzle inserts of both the first and second stages exits through holes in the trailing edges of the inserts and flows through the nozzles to convectively cool the aft parts of the nozzles. This air is discharged through slots in the trailing edges of the first stage nozzles and, in the second stage nozzles, through the same slots as the air flowing around the insert from the holes in its leading edge.

In addition there are passages or openings through the inner ends of the second stage nozzles. Air discharged through these openings cools a second stage diaphragm extending between the second stage nozzles and the first stage of the gas producer turbine rotor.

Also, part of the first cooling air stream flowing through the turbine case is diverted from the first stage nozzles through the trailing edges of the segments in which the nozzles are incorporated. This air flows across and cools the tip shoes surrounding the first stage of the gas producer turbine rotor.

We have now discovered that unexpectedly improved cooling can be obtained by so redirecting the air diverted from the first stage nozzles through the trailing edges of the nozzle segments into contact with the first stage tip shoes as to obtain impingement cooling and then film cooling of the tip shoes.

We have also found that unexpectedly superior cooling can be obtained by employing that air used in the earlier disclosed cooling system to cool the second stage diaphragm to instead cool a nozzle case lip supporting the upstream ends of the second stage nozzle segments and to then form a buffer which keeps hot gases from entering the space between the nozzles and the nozzle case.

From the foregoing it will be apparent to the reader that one important and primary object of the invention resides in the provision of novel, improved systems for cooling gas turbine nozzles and turbine components physically associated therewith.

A further important and primary object of the present invention resides in the provision of systems in accord with the preceding object which are improvements over the turbine nozzle cooling systems described in parent application Ser. No. 831,961.

Other important objects and features and additional advantages of the present will become apparent from the appended claims and as the ensuing detailed description and discussion proceeds in conjunction with the accompanying drawing, in which:

FIGS. 1A and 1B, taken together, constitute a partly sectioned side view of a gas turbine engine having cooling systems embodying the principles of the present invention;

FIG. 3 is a perspective of an internally cooled first stage nozzle and insert assembly employed in the engine of FIGS. 1A and 1B;

FIG. 4 is a section through a nozzle in the assembly of FIG. 3 taken substantially along line 4—4 of the latter Figure;

FIG. 5 is a view similar to FIG. 3 of an internally cooled second stage nozzle and insert assembly employed in the engine of FIGS. 1A and 1B;

FIG. 6 is a side view of the assembly of FIG. 5;

Figure 1A:
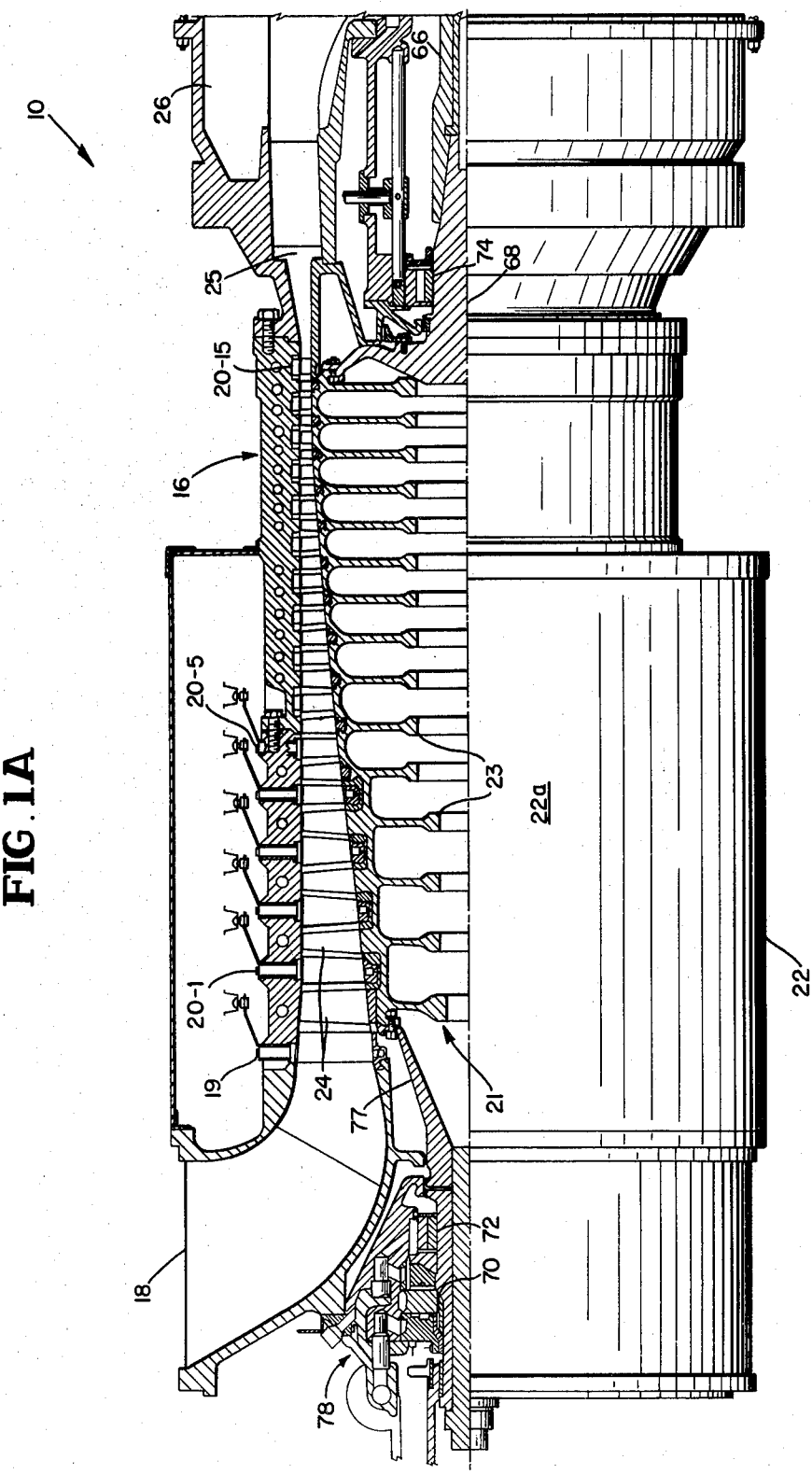
Figure 1B:
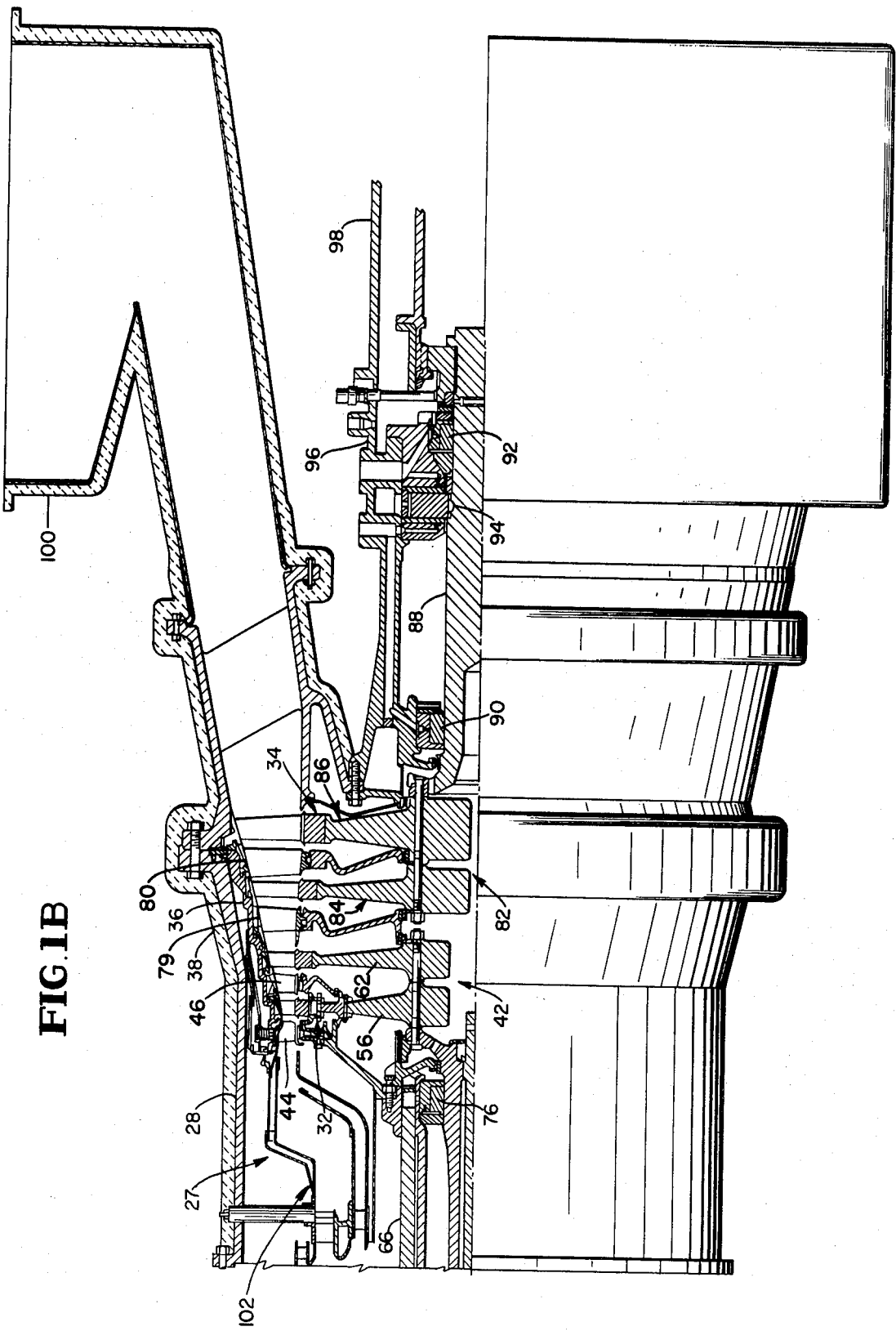
Figure 2:
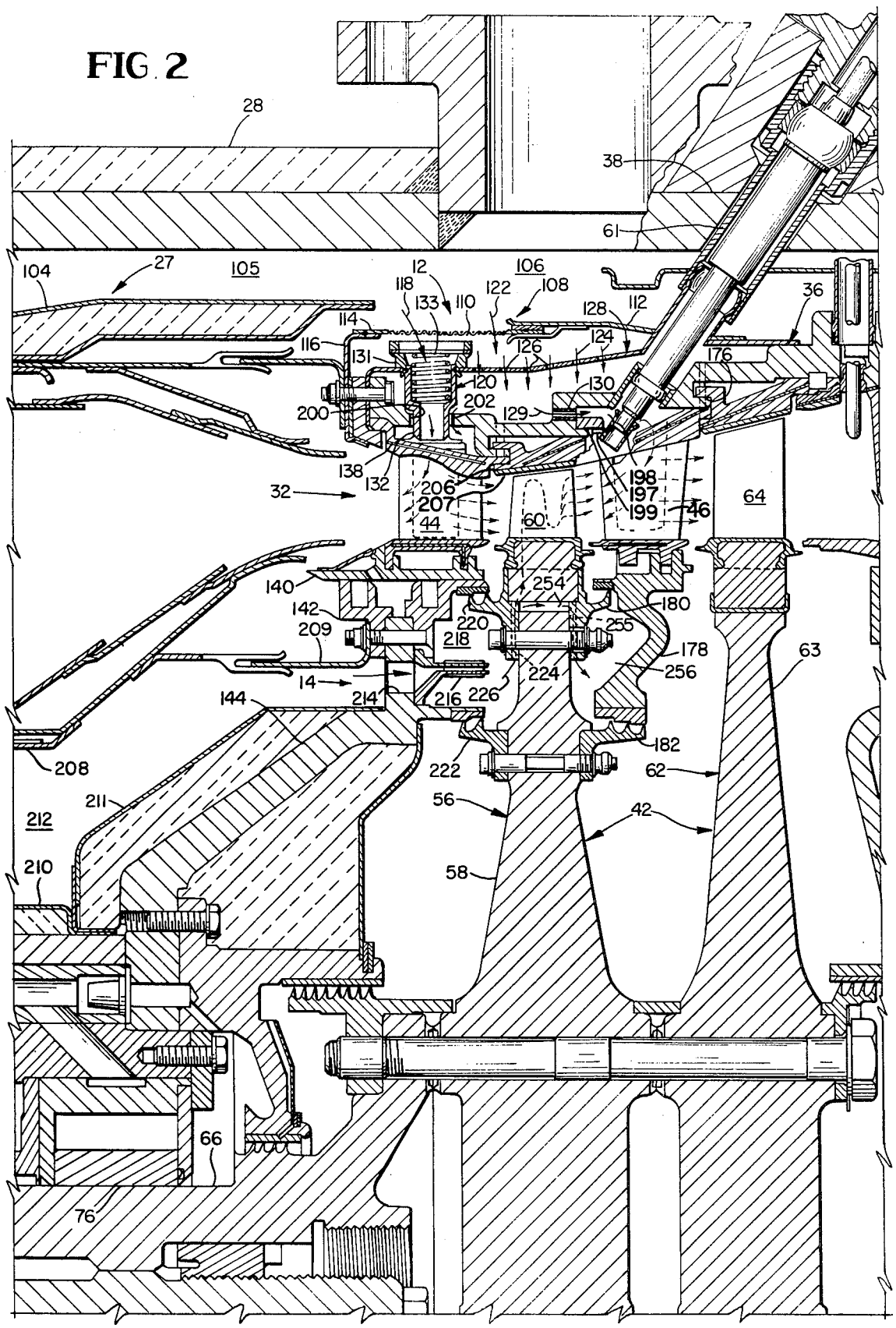
FIG. 2 is a fragment of the foregoing view to an enlarged scale.

Referring now to the drawing, FIGS. 1A and 1B depict a two-shaft, gas turbine engine 10 equipped with turbine case and nozzle and turbine rotor cooling systems 12 and 14 constructed in accord with and embodying the principles of the present invention (see FIG. 2).

Engine 10 includes a fifteen-stage axial flow compressor 16 with a radial-axial inlet 18, inlet guide vanes 19, stators 20, and a fifteen-stage rotor 21. The inlet guide vanes 19 and stators 20 are supported from the compressor housing 22 with the guide vanes and stators 20-1 through 20-5 of the first five stages being pivotally mounted so that they can be adjusted to control the flow of air through the compressor.

Each of the fifteen stages of the rotor 21 consists of a disc 23 with radially extending blades 24 fixed to the periphery of the disc. The stages are integrated into a unitary structure as by electron beam welding.

The compressor housing is split longitudinally along a vertical plane through the axial centerline of engine 10 into sections 22a (only one of which is shown) to accommodate assembly of the compressor and to facilitate inspection, cleaning, and replacement of guide vanes 19 and stators 20 and the blades 24 of compressor rotor 21.

The high pressure air discharged from compressor 16 flows through a diverging diffuser 25 and an enlarged dump plenum 26 to an annular combustor 27 supported in an insulated combustor case 28.

The compressor discharge air heated by combustor 27 and the combustion products generated in the combustor are expanded through a two-stage gas producer turbine 32 and then through a two-stage power turbine 34. The turbines are rotatably supported in a nozzle case 36 mounted in an annular turbine housing 38.

As best shown in FIG. 2, the gas producer turbine 32 has a two-stage rotor 42 and stationary, internally cooled, first and second stage nozzles 44 and 46.

The first stage nozzles are integral components of nozzle segments 52 each having two nozzles 44. The second stage nozzles are, similarly, integral components of nozzle segments 54 each having two second stage nozzles 46.

The first stage 56 of gas producer turbine rotor 42 includes a disc 58 to which internally cooled, radially extending blades 60 are fixed. An optical pyrometer 61 is sighted on blades 60 to measure their temperature.

The second stage 62 of the rotor includes a disc 63 with uncooled, radially extending blades 64 mounted on its periphery.

The two stages of the gas producer turbine rotor 42 are bolted to each other (see FIG. 2) and, in cantilever fashion, to the rear end of a forwardly extending shaft 66. Shaft 66 is coupled through rear compressor hub 68 to compressor rotor 21, thereby drive-connecting gas producer turbine 32 to the compressor.

The compressor and gas producer turbine are rotatably supported by a thrust bearing 70 and by tapered land bearings 72, 74, and 76. Bearings 70 and 72 engage the front compressor hub 77 which is bolted to rotor 21 and is drive-connected to an accessory drive 78.

Power turbine 34 includes first and second stage nozzles 79 and 80 also supported from nozzle case 36 and a rotor 82 having a first bladed stage 84 and a second, bladed stage 86 bolted together for concomitant rotation. Rotor 82 is bolted to a power turbine shaft assembly 88 rotatably supported by tapered land bearings 90 and 92 and a thrust bearing 94. The shaft assembly is connected through a coupling 96 to an output shaft assembly 98 which furnishes the input for a generator, booster compressor, mechanical drive, or other driven unit.

The final major components of turbine engine 10 is an exhaust duct 100 for the gases discharged from power turbine 34.

For the most part, the details of the gas turbine engine 10 described above are not relevant to the practice of the present invention. Therefore, they will be described only as necessary to provide a setting for and facilitate an understanding of the latter.

Referring now primarily to FIG. 2, but also to FIGS. 1A and 1B, combustor 27 includes a flame tube 102 surrounded on its outer side by an insulated, annular, outer air liner 104 spaced inwardly from annular combustor case 28 to form an annular passage 105. Air discharged from compressor 16 can bleed from dump plenum 26 through passage 105 to an annular plenum 106 between turbine housing 38 and turbine nozzle case 36. A screen assembly 108 composed of a screen 110 supported from the nozzle case by brackets 112 and 114 and a clamp ring 116 isolates plenum 106 from the interiors of first and second stage nozzles 44 and 46.

As shown by arrow 118 in FIG. 2, one stream of the compressor discharge air flows from plenum 106 through transfer tubes 120 into the internally cooled first stage nozzles 44 of the gas producer turbine. A second stream of the compressor discharge air (see arrows 122 and 124) flows through apertures 126 in an impingement shroud 128 surrounding the nozzle case and impinges against the latter to cool it. As shown by arrow 129, this air then flows through transfer tubes 130 into the internally cooled, second stage nozzles 46 of the gas producer turbine.

Transfer tubes 120 each include a retainer 131 extending through and fixed to shroud 128 and an air tube 132 extending through nozzle case 36 and biased against the outer end of the associated first stage nozzle by a spring 133. Transfer tubes 130 have a dogbone configuration as shown in FIG. 5.

As suggested briefly above and shown in FIG. 3, first stage nozzles 44 are incorporated in nozzle segments 52, each of which include two nozzles, an outer shroud 134, and an inner shroud 136. The outer shrouds are seated in recesses in nozzle case 36 with seal strips 138 spanning the gaps between adjacent segments. The inner shrouds are seated in recesses in a sliding ring 140 which cooperates with a rim seal assembly 142 and a first stage nozzle diaphragm assembly 144 to isolate the gas producer turbine from the combustor section of gas turbine engine 10.

As shown in FIG. 4, nozzles 44 are hollow; and each nozzle has an insert 146 extending longitudinally therethrough and spanning approximately the leading one-half of the nozzle. The outer ends of the inserts communicate with the inner or outlet ends of transfer tubes 120, compressor discharge air supplied through the transfer tubes therefore flowing into inserts 146.

Part of the air thus supplied to each insert exits through openings 148 in the leading edges of the insert. As shown by arrows 150, this air flows around the insert and then toward the trailing edge of the associated nozzle, cooling the leading edge portions of the nozzle. This air exits through slots 152 and 154 on the suction and pressure sides of the nozzle as shown by arrows 156 and 158 and then flows over the external nozzle surfaces toward the trailing edge, cooling the external surfaces by film cooling.

Pins 160 extend from the side walls of each nozzle 44 into contact with the insert 146 therein. These pins cause turbulence in the air flowing through the nozzles in the manner just described, increasing the rate of heat transfer between the air and the side walls of the nozzles.

The remainder of the compressor discharge air introduced into the insert 146 in each nozzle 44 exits through openings 162 in the trailing edge of the insert as shown by arrow 164 in FIG. 4. This air flows toward the trailing edge of the nozzle, cooling the aft part thereof with pins 160 again being employed to promote the rate of heat transfer. This air is discharged through openings 166 in the trailing edge of the nozzle as shown by arrow 168.

Figure 7:
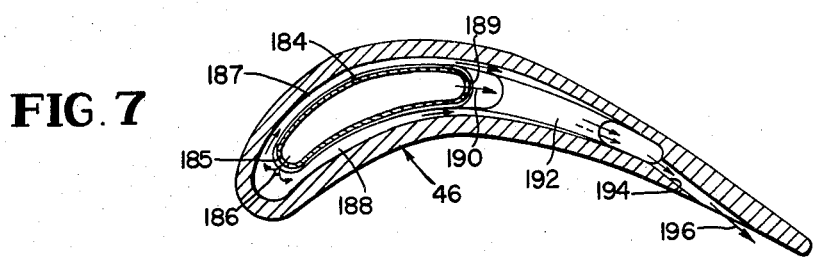
FIG. 7 is a section through a nozzle in the assembly of FIGS. 5 and 6 taken substantially along line 7—7 of FIG. 6.

Turning now to FIGS. 5—7, the nozzle segments 54 in which the second stage nozzles 46 are incorporated also have an outer shroud 170 in which a wedge-shaped plenum 172 is formed and an inner shroud 174. The outer shrouds are fitted in a slot 176 in nozzle case 36; and inner shrouds 174 are fitted in recesses formed in an annular, second stage nozzle diaphragm 178. The second stage nozzle diaphragm co-operates with seals 180 and 182 bolted to the downstream side of gas producer turbine rotor first stage disc 58 to confine the working fluid to a path through the nozzles and turbine blades.

The transfer tubes 130 into which air flows after impinging on casing 36 extend through the nozzle case and the front walls 183 of the second stage turbine segment outer shrouds 170 into fluid communication with the wedgeshaped inlet plenums 172 formed in the outer shrouds.

From the inlet plenums, the air flows into inserts 184 extending longitudinally through nozzles 46. As in the case of nozzles 44, part of this air is discharged through openings 185 in the leading edges of the inserts and flows back along the inserts toward the trailing edges of the nozzles as shown by arrows 186 to cool the forward parts of the nozzles. Ribs 187 and 188 spaced longitudinally in the nozzles promote heat transfer between the air and the nozzle walls.

The remainder of the air is discharged through openings 189 in the trailing edges of the inserts as shown by arrow 190. This air flows toward the trailing edges of the nozzles across heat transfer promoting crossover ribs 192 and, together with the air discharged through the forward ends of the inserts, exits from the nozzles through slots 194 on the pressure sides, and adjacent the trailing edges, of the nozzles as shown by arrow 196.

Referring now to FIG. 6, openings 197 are formed in front walls 183 of second stage nozzle segments 54. Part of the air supplied to the wedge-shaped plenums 172 of those segments through transfer tubes 130 is discharged through openings 197 (see FIGS. 5 and 6) as indicated by arrow 198 to impingement cool the second stage nozzle segment support lip 199 of nozzle case 36 (see, also, FIG. 2). This air then forms a buffer, keeping hot gases from entering the space between the nozzles and case 36.

Also, as shown in FIG. 2, a part of the air flowing through impingement shroud 128 to cool nozzle case 36 flows through annular gaps 200 in nozzle case 36 around transfer tubes 120 as shown by arrow 202. This air exits through openings 204 in outer shroud rear walls 205 (see FIG. 3) and impingement cools the front or upstream face 206 of the tip shoe segments 207 surrounding gas producer turbine rotor first stage 56 (see FIG. 2). This air then forms a film and flows across the inner surfaces of tip shoe segments 207, further cooling those segments.

The gaps between the tip shoe segments 207 and, also, the gaps between the second stage nozzle segments 54 are closed by seal strips like those identified by reference character 138 in FIG. 2.

Referring again in FIGS. 1A and 1B and FIG. 2, an inner air liner 208, a ring 209, and covers 210 and 211 form an inner, annular, passage 212 through which compressor discharge air can flow from dump plenum 26 to first stage nozzle diaphragm 144. This air is employed in the cooling system 14 for the first stage 56 of gas producer turbine rotor 42.

From plenum 212 the air flows through apertures 214 in diaphragm 144 and swirlers 216 into a plenum or cavity 218 defined by the diaphragm, rim seal assembly 142, the disc 58 of the rotor first stage 56, and labyrinth seals 220 and 222 bolted to the upstream side of the latter. Swirlers 216 are employed to impart a tangential component to the air flowing through apertures 214 so that, when it is taken on board the first stage of the gas producer turbine rotor, its velocity component will approximate that of the rotor, minimizing viscous drag on the latter.

The air in plenum 218 assists in cooling first stage nozzle diaphragm 144 and gas producer turbine first stage rotor disc 58 and flows upwardly through passages 224 in seal 220 as shown by arrow 226 to the root or inner ends of first stage, internally cooled, rotor blades 60.

Figure 9:
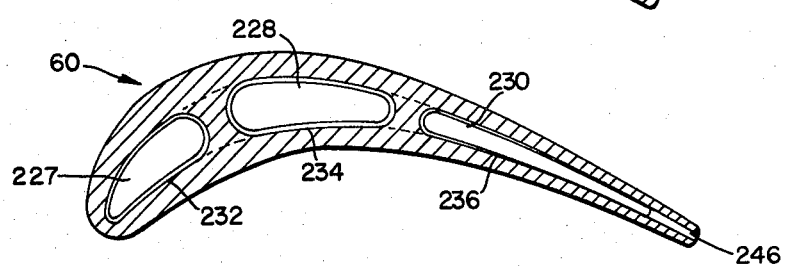
FIG. 9 is a section through the blade taken substantially along line 9—9 of FIG. 8.
Figure 8:
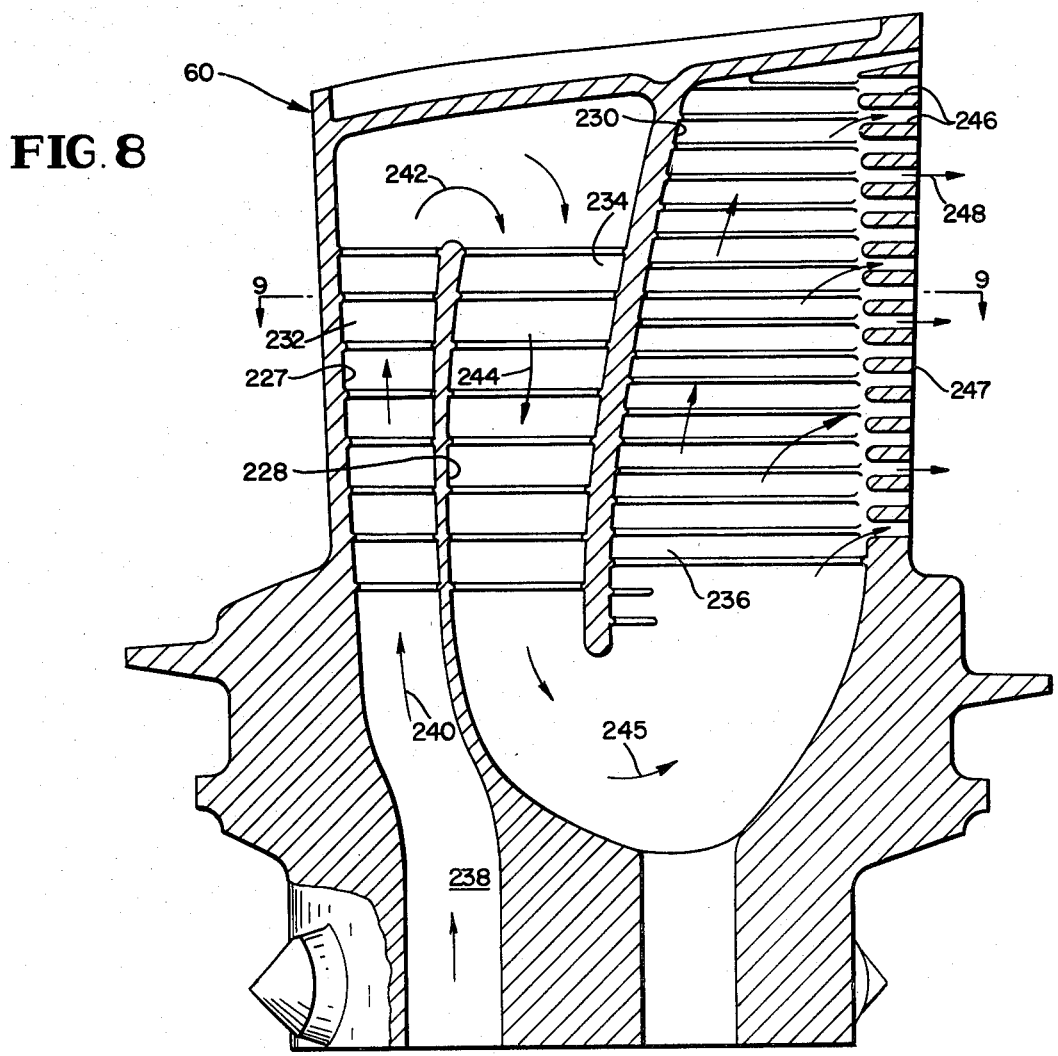
FIG. 8 is a vertical section through a first stage blade of a gas producer turbine rotor incorporated in the engine of FIGS. 1A and 1B.

Referring now to FIGS. 8 and 9, blades 60 have internal cavities 227, 228, and 230 in which inserts or trip strips 232, 234, and 236 are mounted. Air flowing radially outward through passages 224 is introduced into the leading edge cavities 227 in blades 60 through inlet passages or orifices 238 as shown by arrow 240. This air flows outwardly through cavity 227, reverses its direction as shown by arrow 242, flows inwardly through mid-chrod cavity 228 as shown by arrow 244, then again reverses direction as shown by arrow 245, and flows outwardly through slots 246 in the trailing edge 247 of the blade as shown by arrow 248.

A part of the air introduced into passages 224 is diverted through longitudinally extending passages 254 in disc 58 and radial passages 255 through seal 180 into a plenum 256 defined by the disc, seals 180 and 182, and second stage nozzle diaphragm 178. This air is employed to cool the disc, to assist in cooling the diaphragm, and for hot gas buffering between the disc and diaphragm. As indicated above, about 40 percent of the air flowing to the first stage rotor will be employed in this manner in the exemplary gas turbine engine 10 described above and illustrated in FIG. 1.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by Letters Patent is:

1. A gas turbine comprising: a nozzle case through which heated gases are adapted to flow; a housing surrounding said case in spaced relation thereto; first and second stage, flow directing nozzles integrated into nozzle segments which are supported from said case, said case having a lip supporting the upstream ends of the second stage nozzle segments therefrom; means for directing a first stream of air from the space between said housing and said case into the nozzles in the first of said stages; means for directing a second stream of air from said space into impinging relationship with said case and then into nozzles in the second of said stages; and means for so discharging a part of said second stream of air from the interiors of the second stage nozzles into said nozzle case at the leading sides of said nozzles as to cause said air to first impingement cool said nozzle segment supporting lip and to then form a buffer for keeping heated gases flowing through said case from entering the space between said nozzles and said case.

2. A gas turbine as defined in claim 1 in which the second stage nozzle segments have plenums at the outer ends thereof which are in part bounded by radially extending front walls and in which the means for discharging said air from said second stage nozzles are apertures through said front wall segements, said aperatures providing communication between said plenums and the exteriors of said nozzle segments.

3. A gas turbine comprising: a nozzle case through which heated gases are adapted to flow; a housing surrounding said case in spaced relation thereto; first stage, flow directing nozzles integrated into nozzle segments supported from said case; second stage, flow directing nozzles integrated into nozzle segments supported from said case in longitudinally spaced relation to the first stage nozzle segments; a bladed rotor rotatably supported in said nozzle case between said first and second stage nozzles; tip shoe means supported from said case in surrouding relationship to said rotor; and means for cooling said nozzles, said case, and said tip shoe means comprising means including transfer tubes disposed in passages extending through the nozzle case and communicating at opposite ends thereof with the space between the case and the housing and with the nozzle interiors for directing a first stream of air from the space between said housing and said case to the interiors of the nozzles in said first stage, means for diverting a second stream of air through said nozzle case around said transfer tubes to said first stage segments, apertures in the trailing edges of said segments for so directing said diverted air into contact with and across the exposed surfaces of said tip shoe means as to first impingement cool and then film cool said tip shoe means, means in the space between said housing and said case and surrounding the latter for directing a third, separate stream of air from said space into impinging relationship with said case in the span between said first and second nozzle stages around the periphery of said case, and means for then directing said third stream of air into the interiors of the nozzles in the second stage.

* * * * *